United States Patent [19]

Davies

[11] 4,086,376

[45] Apr. 25, 1978

[54] POLYPHENYLENE SULPHIDE APPLICATIONS

[75] Inventor: Glyndwr John Davies, London, England

[73] Assignee: The Glacier Metal Company Limited, Wembley, England

[21] Appl. No.: 607,501

[22] Filed: Aug. 25, 1975

[30] Foreign Application Priority Data

Sep. 18, 1974 United Kingdom ............... 40700/74

[51] Int. Cl.² .......................... B05D 1/24; B05D 3/02
[52] U.S. Cl. ...................................... 427/185; 252/12;
260/823; 427/195; 427/201; 427/314; 427/318;
427/375; 428/419; 428/457
[58] Field of Search ............ 428/457, 419; 260/37 R,
260/823; 252/12; 427/185, 195, 201, 375, 314,
318

[56] References Cited

U.S. PATENT DOCUMENTS

| 2,997,776 | 8/1961 | Matter et al. .................... 427/185 X |
| 3,090,696 | 5/1963 | Gemmer ......................... 427/185 X |
| 3,140,195 | 7/1964 | Nagel .................................. 427/185 |
| 3,285,850 | 11/1966 | Graham ............................. 252/12 X |
| 3,555,108 | 1/1971 | Bilow et al. ......................... 260/823 |
| 3,592,783 | 7/1971 | Edmonds ........................... 252/12 X |
| 3,730,893 | 5/1973 | Bilow et al. ....................... 252/12 X |
| 3,801,379 | 4/1974 | Blackwell ........................ 427/195 X |
| 3,878,113 | 4/1975 | Campbell et al. ..................... 252/12 |
| 3,882,030 | 5/1975 | Campbell et al. ..................... 252/12 |
| 3,979,543 | 9/1976 | Higbee ............................. 428/419 X |

Primary Examiner—Michael F. Esposito
Assistant Examiner—Shrive P. Beck
Attorney, Agent, or Firm—Burns, Doane, Swecker & Mathis

[57] ABSTRACT

A method of applying a bearing lining at least 0.005 inch thick of polyarylene sulphide to a bearing backing, which comprises applying to said backing a powder composition consisting of at least 80% by weight of uncured polyarylene sulphide together with at least 10% by weight of precured polyarylene sulphide, said precured polyarylene sulphide having been cured by being heated in air for 2 hours at at least 400° C and is in the form of particles with sizes in the range 53-211 microns, and then heating and curing the uncured polyarylene sulphide of the coating by heating to a temperature of at least 380° C. To produce the cured powder, uncured powder is mixed with salt and then cured; the salt prevents the powder from coalescing, and is subsequently dissolved out.

8 Claims, No Drawings

POLYPHENYLENE SULPHIDE APPLICATIONS

This invention relates to methods of applying bearing linings of polyarylene sulphide and in particular of polyphenylene sulphide to a bearing backing, for example an elongate flat strip for manufacture in a continuous process for subsequent cutting into local lengths for forming into shell bearings, or preformed bearing backings of more complicated configuration.

In general bearing linings are required to be at least 0.005 or 0.010 inch thick and in some cases could be as thick as 0.020 inch, and the object of the present invention is to provide a method of obtaining a lining of that order of thickness which is of reasonably uniform thickness over the bearing surface of the backing. Moreover, it is necessary to provide an effective bond of the lining to the backing.

According to the present invention in a method of applying a bearing lining of polyarylene sulphide to a bearing backing the backing is coated with powder consisting of uncured polyarylene sulphide together with some precured polyarylene sulphide and the polyarylene sulphide is cured by heating.

Spraying techniques for example for lining pots and pans are satisfactory for very thin linings but not for linings within the range of thicknesses defined above. Moreover if the backing is dipped in say a fluidised bed of powder although a reasonably thick lining can be obtained it tends to fall under gravity during the period of 1 or 2 hours necessary for curing so that a uniform thickness is not obtained.

However it has been found that if in accordance with the invention uncured polyarylene sulphide powder contains some, perhaps 10 or 20% by weight of precured powder that increases the viscosity sufficiently for a reasonably uniform thickness lining to be achieved at the end of the curing period. The greater the degree of curing of the precured powder or the greater the amount of precured powder included with the uncured powder the more uniform will the thickness of the lining be.

Cured polyphenylene sulphide powder is not easy to obtain because if uncured powder is cured on its own a block is obtained which is very difficult to grind to a reasonably fine powder because of its strength and toughness and according to a preferred feature of the invention the precured powder is obtained by mixing uncured powder with powdered salt like substance such that the substance predominates in the mixture and heating to about 450° C in air. The brittle mass eventually obtained is then easily ground to powder because the salt prevents the polyphenylene sulphide granules from coalescing and after cooling the salt is removed by dissolving in water.

Reference has been made to a salt like substance and in fact sodium chloride is perfectly satisfactory, but other powders will also do provided they do not react with the polyphenylene sulphide, do not fuse at the curing temperature and can be readily desolved in water and in this specification the definition, a salt like substance covers such materials.

The method according to the invention not only enables a reasonably uniform thickness lining to be achieved but also effects good bonding of the lining to the backing particularly if the backing is of aluminium or aluminium alloy or some other material such as steel provided it has an aluminium layer on its bearing surface.

The invention maybe carried into practice in various ways and two examples will now be described by way of example. In the examples which both relate to the use of polyphenylene sulphide that material is abbreviated as PPS.

EXAMPLE 1

PPS powder was mixed with free flowing common salt in proportion by weight of 20 parts PPS to 80 parts NaCl. in a high speed powder mixer. The resultant intimate mixture was placed in shallow trays to a powder depth of about 2 cm and heated in air for two hours at 400–420° C. The salt enabled the PPS to be heated and cured without the PPS particles coalescing at this stage.

After cooling, the mass was broken up and passed through a pin disc mill. The salt was then removed from the resulting powder mixture by continuous washing with water, the undissolved PPS powder being retained on a 300 mesh (53$\mu$) wire sieve.

The PPS powder was dried in an oven at 150° C, and after cooling was sieved to retain the fraction between 53$\mu$ and 211$\mu$ (B.S. 300 - B.S. 72 sieves).

The cured particulate PPS powder thus produced was added at a level of 20% to non-heat-treated PPS powder and the mixture placed in a powder fluidising tank.

Aluminium bearing blanks preheated to 420° C were coated on the bearing surfaces by dipping into the fluidised bed. After coating the parts were kept in air at a temperature of 380° C for 2 hours to cure the coating.

The coating was found to be reasonably uniform with a thickness in the range 0.013 inch – 0.017 inch, because there had been little tendency to flow or drip under the influence of gravity during the 2 hour cure at 380° C.

EXAMPLE 2

The procedure for curing the PPS was as in Example 1 with the following two exceptions:
(i) the common salt was first ground in a pin disc mill to 211$\mu$ before mixing with the PPS;
(ii) after cooling and grinding the cured mixture in Example 1, the ground mixture was replaced in the trays and heated for a further 2 hours at 400 – 420 ° C and then reground, washed and sieved as in Example 1.

The cured powder was mixed in proportions of 10:90 with non-heat-treated PPS and the blanks were satisfactorily fluidised-bed-coated as in Example 1.

The particulate powder thus produced was found to be more effective than that produced in Example 1 in restricting the flow of the non-heat-treated PPS being cured because of the greater degree of cure of the cured PPS, and therefore a lower percentage was used.

What we claim and desire to secure by Letters Patent is:

1. A method of applying a bearing lining at least 0.005 inch thick of polyarylene sulphide to a bearing backing, which comprises applying to said backing a powder composition consisting of at least 80% by weight of uncured polyarylene sulphide together with at least 10% by weight of precured polyarylene sulphide, said precured polyarylene sulphide having been cured by being heated in air for 2 hours at at least 400° C and is in the form of particles with sizes in the range 53–211 microns, and then heating and curing the uncured polyarylene sulphide of the coating by heating to a temperature of at least 380° C.

2. A method as claimed in claim 1 in which the polyarylene sulphide is polyphenylene sulphide.

3. A method as claimed in claim 1 in which the backing is coated in a fluidized bed.

4. A method as claimed in claim 3 in which the backing is preheated to a temperature greater than 380° C before being coated.

5. A method as claim in claim 1 in which after coating with the powder, the backing is retained at a temperature of at least 380° C for about 2 hours.

6. A method as claimed in claim 1 in which the cured bearing lining is at least 0.010 inches in thickness.

7. A method as claim in claim 1 in which the backing is of aluminium or of steel with an aluminium covering.

8. A method as claimed in claim 1 in which the cured polyarylene sulphide powder is obtained by mixing uncured powder with a salt like substance and heated to a temperature in excess of 380° C after which the brittle mass so obtained is ground to powder and washed to remove the salt like substance.

* * * * *